United States Patent
Han

(10) Patent No.: US 8,032,298 B2
(45) Date of Patent: Oct. 4, 2011

(54) METHOD AND APPARATUS FOR INCORPORATING ADAPTIVE SCROLL OPERATION FOR NAVIGATION SYSTEM

(75) Inventor: Maung Han, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1179 days.

(21) Appl. No.: 11/729,596

(22) Filed: Mar. 29, 2007

(65) Prior Publication Data

US 2008/0243375 A1    Oct. 2, 2008

(51) Int. Cl.
*G06F 19/00* (2006.01)
*G09G 5/00* (2006.01)

(52) U.S. Cl. ........ 701/208; 715/800; 345/660; 345/663; 345/664; 345/665; 345/666; 345/667; 345/684

(58) Field of Classification Search .......... 705/784, 705/785, 800; 701/200, 208; 345/684, 687, 345/581, 660, 663, 664, 665, 666, 667, 672, 345/681, 682, 670, 671; 715/800, 700
See application file for complete search history.

(56) References Cited

U.S. PATENT DOCUMENTS

| | | | | |
|---|---|---|---|---|
| 5,787,383 | A * | 7/1998 | Moroto et al. | 701/210 |
| 6,407,749 | B1 * | 6/2002 | Duke | 345/684 |
| 7,307,643 | B2 * | 12/2007 | Moroo et al. | 345/667 |
| 7,405,739 | B2 * | 7/2008 | Gannon | 345/660 |
| 7,689,934 | B2 * | 3/2010 | Neervoort | 715/847 |
| 7,852,357 | B2 * | 12/2010 | Kato | 345/660 |
| 2006/0174213 | A1 * | 8/2006 | Kato | 715/800 |
| 2007/0038955 | A1 * | 2/2007 | Nguyen | 715/804 |
| 2007/0226646 | A1 * | 9/2007 | Nagiyama et al. | 715/784 |
| 2008/0129712 | A1 * | 6/2008 | Nguyen | 345/179 |

FOREIGN PATENT DOCUMENTS

| | | |
|---|---|---|
| JP | 08-069515 | 3/1996 |
| JP | 2004-117830 | 11/2003 |

* cited by examiner

*Primary Examiner* — Ronnie Mancho
(74) *Attorney, Agent, or Firm* — Muramatsu & Associates

(57) ABSTRACT

A method and apparatus for a navigation system achieves a smooth and, intuitive scrolling operation by checking available resources such as a computational power of the navigation system and map data stored in a video memory to determine an optimum scrolling operation and to dynamically adjust a scroll speed and a scale factor to move an image on a monitor screen to a specified location. The method includes the steps of: receiving a scroll signal from an input device for scrolling an image on the monitor screen, checking a current condition of the navigation system related to the scroll operation, and conducting the scroll operation while adjusting the scroll speed and scale factor of the image based on the current condition.

16 Claims, 9 Drawing Sheets

Fig. 1A (Prior Art)
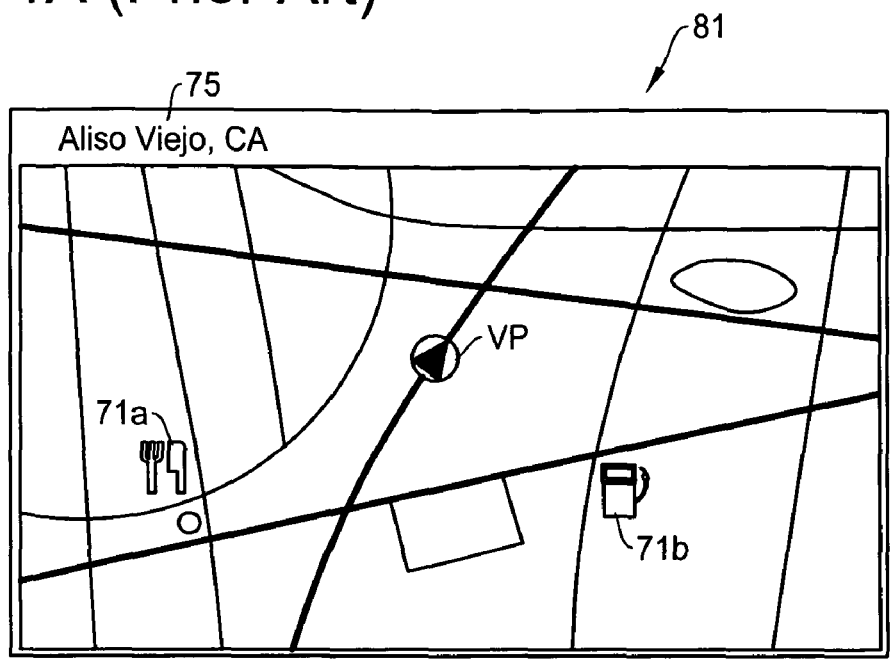
Fig. 1B (Prior Art)
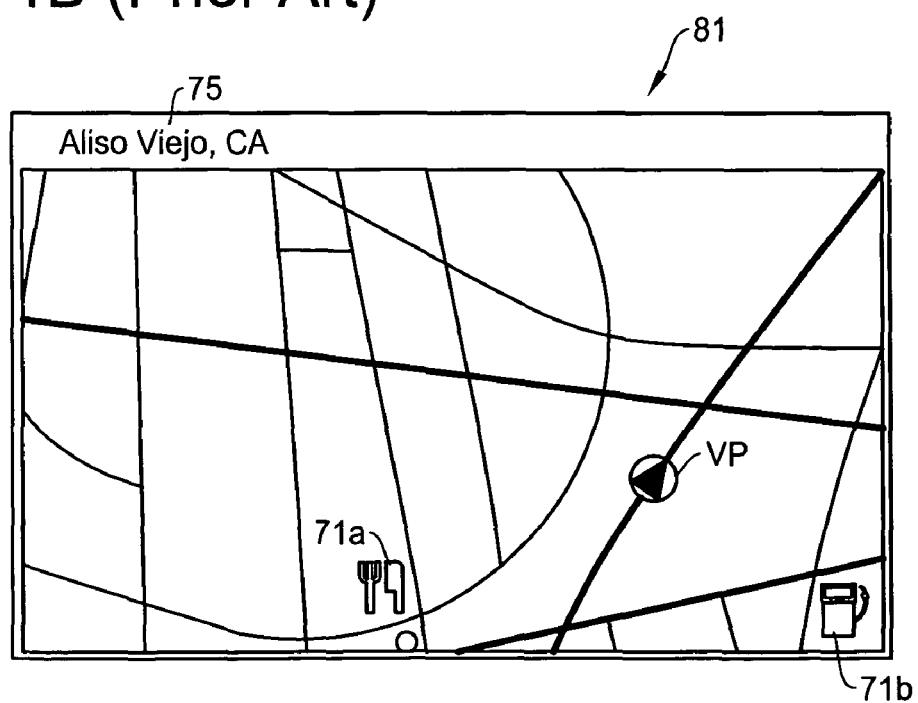

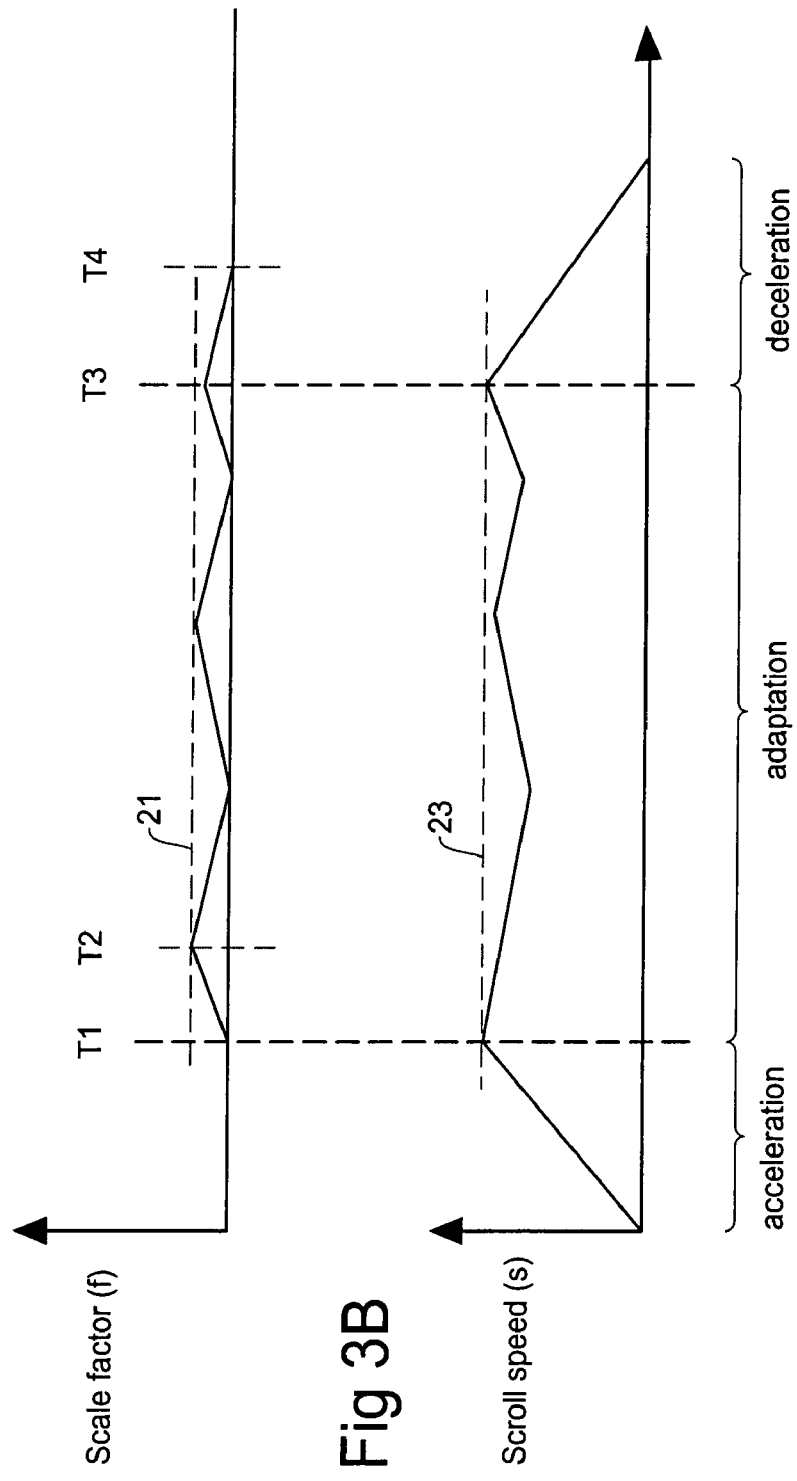

METHOD AND APPARATUS FOR INCORPORATING ADAPTIVE SCROLL OPERATION FOR NAVIGATION SYSTEM

FIELD OF THE INVENTION

This invention relates generally to a method and apparatus of scrolling images for a navigation system, and more particularly, to a method and apparatus of scrolling map images which is capable of adapting available resources of a navigation system and improving operability in pin-pointing the map image to a desired location by dynamically changing a scale factor and a scroll speed.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc, or from a remote server.

When a destination is specified by a user, the navigation system determines a route to the destination based on, for example, the shortest way to reach the destination, the route using many free ways as possible or the route without using toll road, and the like. After determining the calculated route, the navigation system starts the route guidance operation to guide the user along the calculated route to the destination. Typically, the navigation system shows the intersection to show the next turn and a direction of the turn. Such route guidance by the navigation system is also accompanied by voice instructions.

The navigation system displays a map image on a monitor screen on which the calculated route to the destination is illustrated. The user is able to scroll the map image to see desired locations of the map image. FIGS. 1A and 1B show display examples when such an operation of map scrolling is conducted on the navigation system. In this example, FIG. 1A shows a display screen 81 which includes an initial map image, and FIG. 2B shows the display screen 81 which includes a map image coming after scrolling the map image of FIG. 1A toward a down-right direction which is indicated by an arrow A.

The map images in FIGS. 1A and 1B show several roads and two icons 71a and 71b indicating POIs (points of interest), representing a restaurant and a gas station, respectively. The description indicator 75 at the top of the screen typically indicates a road name that intersecting with a current road on which a vehicle, which is indicated by a vehicle position VP, is running to indicate the next turn on the calculated route. The user can scroll the map image by placing a finger on the display and dragging the image or by operating a scroll key on the navigation system or a remote controller. The scroll keys may be configured by eight directional arrow buttons or a joystick key on a remote controller similar to the one commonly used in electric game devices.

In the scrolling operation, the currently available navigation systems utilize either a fixed speed scroll operation or a stepped scroll speed operation. FIGS. 2A and 2B are schematic diagrams showing the fixed scroll speed operation and the stepped scroll speed operation, respectively. In the fixed scroll method shown in FIG. 2A, the scroll speed remains constant as the time changes throughout the operation. In the stepped scroll method shown in FIG. 2B, the scroll speed incrementally changes along with the time.

Thus, in the stepped scroll speed method, as the user scroll the map on the monitor screen, the speed of scrolling accelerates along with the time. The stepped scroll speed method has the advantage that the user can browse the map at a faster rate to save time and reduce distraction. However, in either method of scroll operation, during the scroll operation, the navigation system may not be able to redraw map image with sufficient detail.

Namely, depending on performance factors, such as computation speed, complexity of the map, and available resources, etc., the navigation system may have to simply show empty un-drawn spaces (blank space). As a result, the navigation system fails to provide useful information for scrolling the image to find a desired location on the map image. Therefore, there is a need of a new method and apparatus for scrolling the map image with an optimum size and speed appropriate to currently available resources of the navigation system.

SUMMARY OF THE INVENTION

It is, therefore, an object of the present invention to provide a method and apparatus for a navigation system to scroll a map image with an appropriate speed and size to quickly and accurately change the map screen.

It is another object of the present invention to provide a map scroll method and apparatus for a navigation system to dynamically adjust a scroll speed and a scale factor of the map image depending on the available map data and processing speed in the navigation system.

It is a further object of the present invention to provide a map scroll method and apparatus for a navigation system which can keep displaying essential information on the navigation screen when scrolling the map image.

One aspect of the present invention is a display method for a navigation system. The method includes the steps of: receiving a scroll signal from an input device operated by a user for scrolling an image on a monitor screen of a navigation system, checking a current condition of the navigation system related to a scroll operation, and conducting the scroll operation in response to the scroll signal while adjusting a scroll speed and scale factor of the image on the monitor screen based on the current condition.

The current condition includes an amount of map data stored in a video memory which stores the map data pertaining to an area displayed on the monitor screen of the navigation system. Further, the current condition includes a computing power of the navigation system currently available for the scroll operation.

In the display method, the step of conducting the scroll operation includes a step of conducting an acceleration phase of the scroll operation in which the scroll speed is accelerated, a step of conducting an adaptation phase of the scroll operation in which the scroll speed is adjusted, and a step of conducting a deceleration phase of the scroll operation in which the scroll speed is decelerated so that scroll operation is stopped. The scale factor of the image is unchanged during the acceleration phase and the deceleration phase while the scale factor is adjusted during the adaptation phase.

In the display method, the step of conducting the scroll operation includes a step of defining a drawing area of the image which corresponds to the map data currently stored in the video memory, and a step of defining a viewing area which corresponds to the image currently displayed on the monitor screen, wherein the drawing area is larger than the viewing area. Further, the step of conducting the scroll operation includes a step of increasing the scale factor when the viewing area is substantially smaller than the drawing area. Further, the step of conducting the scroll operation includes a step of increasing the scale factor and scroll speed when the viewing area is substantially smaller than the drawing area and a currently available computing power is high.

In the method of the present invention, the step of conducting the scroll operation includes a step of defining a scroll speed adjustment area which is smaller than the drawing area and is larger than the viewing area, and a step of decreasing the scroll speed or maintaining the same scroll speed when part of the viewing area crosses a boundary of the scroll speed adjustment area. The method further includes a step of increasing the scroll speed when the viewing area is within the scroll speed adjustment area.

Another aspect of the present invention is a display apparatus, for a navigation system for implementing the steps defined in the display methods of the present invention noted above. The apparatus includes various means to adjust the scroll speed and scale factor when scrolling the image on the monitor screen. The display apparatus adjust the scroll speed and scale factor by checking the available resources such as a computational power of the navigation system and map data stored in a video memory.

According to the present invention, when the user operates scroll keys, the navigation system scrolls a map image on the monitor screen with an appropriate speed and size of the map image to quickly and accurately scrolls the map image to a specified direction and location. The navigation system dynamically adjusts the scroll speed and the scale factor of the map image depending on the available system resources such as map data and processing speed in the navigation system. Therefore, the navigation system is able to keep displaying the essential information on the monitor screen when scrolling the map image.

BRIEF DESCRIPTION OF THE DRAWINGS

FIGS. 1A and 1B are schematic diagrams showing display examples where a map image is scrolled on the monitor screen of a conventional navigation system where a map image of FIG. 1A is scrolled to lower-right direction in FIG. 1B.

FIGS. 3A and 3B are graphs showing the scale factor and scroll speed in the scrolling method of the present invention where FIG. 3A shows changes of scale factor in relation to time frame involving an acceleration phase, adaptation phase, and deceleration phase, and FIG. 3B shows changes of scroll speed in relation to the time frame involving the acceleration phase, adaptation phase, and deceleration phase.

FIG. 4A shows the scale factor between the times T1 and T2 and FIG. 4B shows the scale factor between the times T3 and T4 shown in FIG. 3A.

DETAILED DESCRIPTION OF THE PREFERRED EMBODIMENT

The method and apparatus under the present invention is described in detail with reference to the accompanying drawings. In the following, the description will be made for the case where the adaptive scrolling method and apparatus is applied to a vehicle navigation system. However, the adaptive scrolling method and apparatus under the present invention can be implemented to other devices, such as portable devices such as PDAs, cellular phones, personal computers, etc.

The method and apparatus of the present invention provides a more efficient way of scrolling images or data on the monitor screen of the navigation system. The scrolling method and apparatus of the present invention dynamically adjusts a scroll speed and a scaling factor to provide a smooth and efficient scrolling operation for the desired map image while achieving intuitive operability. Basically, the scroll speed and the scaling factor are adjusted to improve the operability while taking the currently available resources of the navigation system such as a computing power, data complexity, etc. into consideration.

FIGS. 3A and 3B are graphs showing the scale factor and scale speed involved in the scrolling method of the present invention. FIG. 3A shows changes of the scale factor in relation to time frames involving an acceleration phase, an adaptation phase, and a deceleration phase. FIG. 3B shows changes of the scroll speed in relation to the time frames involving the acceleration phase, the adaptation phase, and the deceleration phase.

In FIG. 3A, the increase of scale factor means that a map scale during the scroll is increased, i.e., the map image is zoomed-out. Thus, a wider area of image can be displayed on the monitor screen when the image is scrolled toward a specified direction. In the example of FIG. 3A, the scale factor is increased between time T1 and time T2 while it is decreased between time T3 and time T4.

Figure 2A:
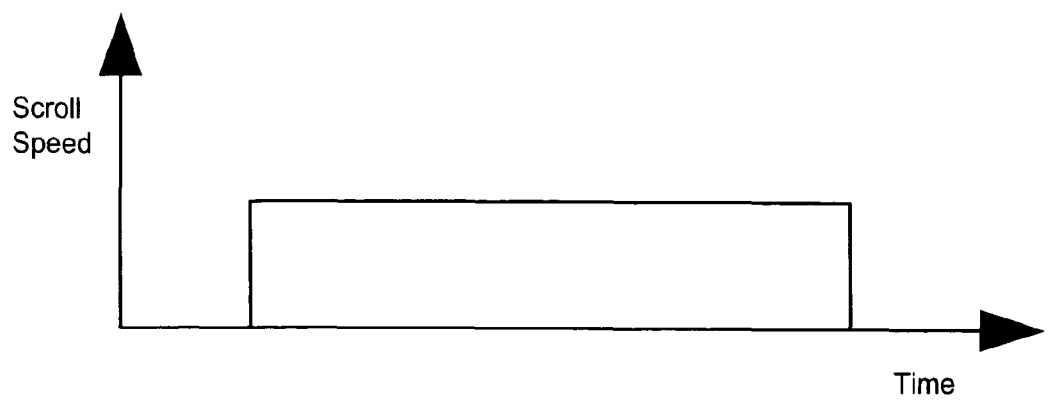
FIGS. 2A and 2B are schematic diagrams showing graphical representation of a fixed speed rate operation and a stepped speed rate operation when scrolling the image on the monitor screen of the navigation system.
Figure 2B:
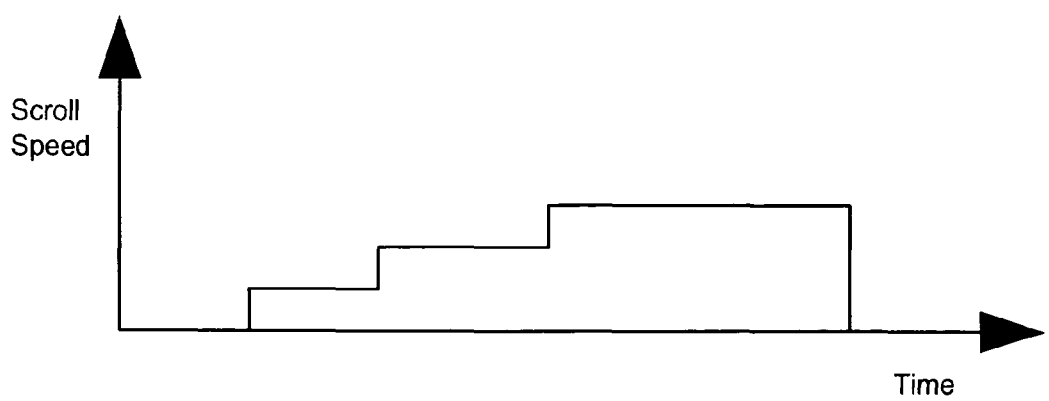
Figure 4A:
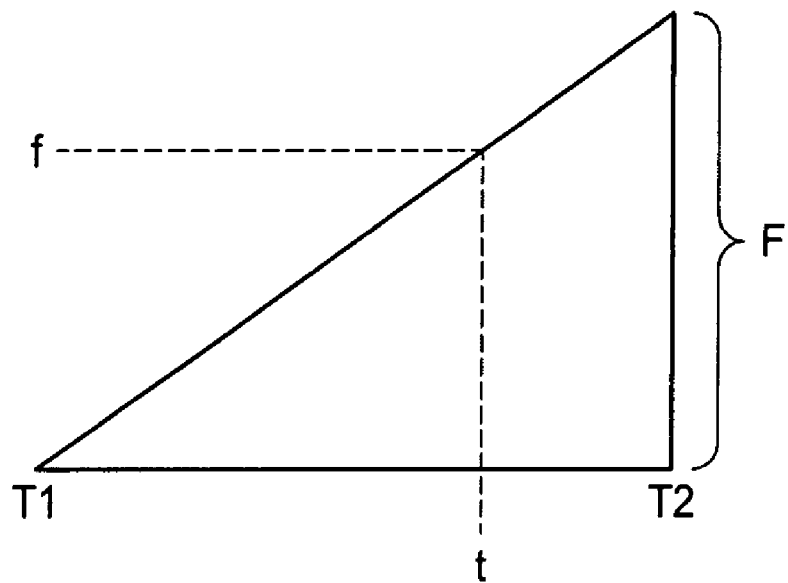
FIGS. 4A and 4B are schematic diagrams showing enlarged views of changing slopes of the scale factor where
Figure 4B:
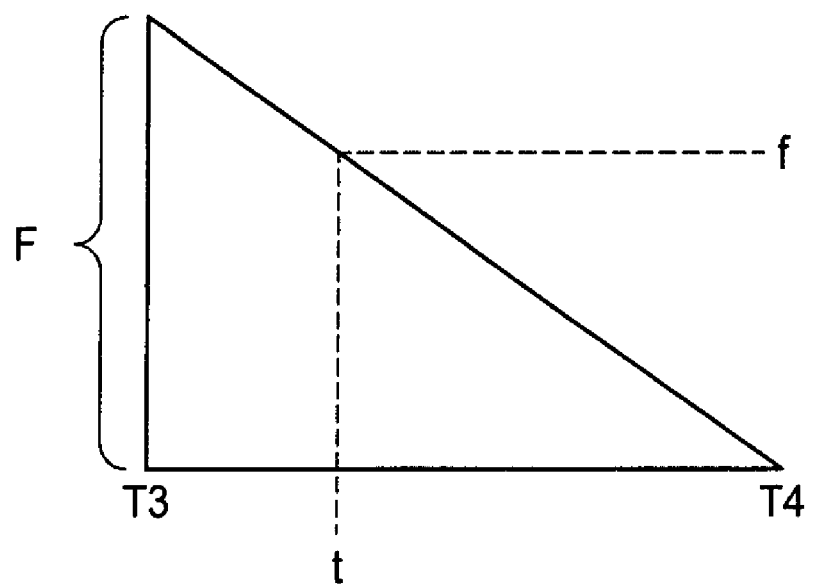

FIGS. 4A and 4B are schematic diagrams showing enlarged views of changing slopes of the scale factor that correspond to that shown in FIG. 3A. FIG. 4A shows the scale factor that increases in a constant rate between the times T1 and T2 shown in FIG. 3A. FIG. 4B shows the scale factor that decreases in a constant rate between the times T3 and T4 shown in FIG. 3A.

In FIG. 3B, the increase of scroll speed means that the image on the monitor screen changes toward a specified direction at a higher speed than before. The faster the scroll speed, the more quickly the map image on the navigation system changes. In the example of FIG. 3B, the scroll speed is increased during the acceleration phase while it is decreased during the deceleration phase.

The adaptive scrolling method of the present invention is able to provide an efficient and intuitive scrolling operation of a map image, data, etc., by dynamically changing the scale factor and scroll speed as the user scrolls the screen. As noted above, basically, the scroll speed and the scale factor are adjusted to improve the operability while evaluating the currently available resources of the navigation system such as a computing power, data complexity, etc. As a consequence, it is able to avoid uncontrollable movement or blank scroll screen that fails to provide useful information to the user when the system resources are limited.

The steps under the embodiment of the present invention can be divided into the acceleration phase, the adaptation phase, and the deceleration phase as shown in FIGS. 3A and 3B. In this example, the period from the start of the scrolling operation to the time T1 is the acceleration phase, and the period from the time T1 to the time T3 is the adaptation phase. Finally, the period from the time T3 to the end of the scrolling operation is denoted as the deceleration phase.

The acceleration phase is the first phase in the scrolling procedure which starts when the user operates the scroll key. During the acceleration phase, as shown in FIG. 3B, the scroll speed is increased from zero to a predetermined speed so that the map image changes slowly at first but changes faster with the time passage. In this example, the scroll speed gradually and linearly increases during the acceleration phase because the slope indicating the scroll speed is a straight line.

If the user stops the scrolling operation during the acceleration phase, the movement of the monitor screen will stop almost immediately since the scroll speed is not reached to the higher speed, i.e, an inertia is small. This feature allows the user to perform a fine adjustment of the location without slippage. Here, the slippage refers to the condition where the scroll does not stop immediately at a desired location but overruns, thus, the user has to move the map image backwardly. The user may have to repeat this forward and backward operations two or more times.

During this phase, as noted above, the scroll speed (s) changes, linearly with the linear acceleration factor (a), such as:

$$s=s*(1+a), t<T1$$

where t is a current time, and T1 is a predetermined time from the start of the scroll operation to end the acceleration phase, and the acceleration factor "a" is selected to be 0<a<=1.0.

During the acceleration phase, the navigation system expects that the distance to the new area on the map to be small and the scroll speed is low. This allows the user a fine adjustment of the screen to a specific location because the inertia is small. This means that if the user stops the scrolling operation during this phase, the map image stops immediately at the specific location. During the acceleration phase, the scaling factor remains unchanged as shown in FIG. 3A.

After the acceleration phase, the navigation system starts the adaptation phase which is the period between the time T1 and the time T3 in FIGS. 3A and 3B. During the adaptation phase, the navigation system expects that the target area intended by the user may be substantially distanced from the current position. Thus, the navigation system adjusts both the scale factor and the scroll speed for better performance of the map scrolling operation. Typically, the scale factor is slightly increased as shown in FIG. 3A to illustrate a denser map, i.e., the map that covers wider area, without losing any details.

The value of the scale factor can be predetermined so that the user will see the same level of details in the roads and other elements such as names, icons, etc. Thus, the user is able to track the map image without losing sight on the map. This is because the user is able to see the elements such as icons and roads with substantially the same level of details as that were visible before the scaling factor has been changed.

As shown in FIG. 3B, during the adaptation phase, the scroll speed is either decreased (slowed down) or increased (speeded up) within a certain limit depending on map drawing capabilities at respective conditions. That is, if the map drawing performance is expected to be slow because, for example, a central processor unit (CPU) is busy doing other complicated jobs, the scroll speed is slowed down. In contrast, if the map drawing performance is expected to be sufficiently high, the scroll speed is increased.

Specifically, as will be described in more detail later, the navigation system will check whether the map to be drawn on the display can be drawn within a required time while avoiding inappropriate map images. This is done by checking available resources such as a computer power or an amount and complexity of map data involved in the scroll operation. Such inappropriate map images include slippery or jerky movements of the image or blank screens with no or insufficient map elements.

Rather than showing a blank screen that fails to convey necessary information, the navigation system will slightly slow down the scroll movement and show the same level of detail as that of the previous display. The scale factor may also be reduced to shrink the view area, i.e., the map that covers narrower area. This allows a longer time (less calculation power) for the navigation system to draw necessary map images on the monitor screen.

When the user stops scrolling at the time T3, the navigation system will proceed to the deceleration phase. During the deceleration phase, a scrolling inertia is involved, which refers to the continued movement to keep scrolling after the user released the scroll keys, while the scroll movement is gradually slowing down. Thus, the scrolling procedure will come to a gradual stop rather than an abrupt end. It should be noted that, as describe above, an inertia is not involved during the acceleration phase (before the adaptation phase) to allow the user to make fine adjustments with small scroll movements.

If the user starts the scrolling operation again during the deceleration phase, the navigation system increases the scrolling speed from the current speed rather than starting from zero (0). This improves the visibility of the map display in which dizziness that may be caused by fast movement and abrupt stops will be avoided. During the deceleration phase, the scale factor is gradually brought back (decreased) to the original value by the time T3 as shown in FIG. 3A.

The operation of the adaptive scrolling method during the adaptation phase is described in more detail with reference to FIGS. 3A to 7. During the adaptation phase, the navigation system will repeatedly check the conditions to determine whether the navigation system can display the satisfactory map image as the scrolling operation continues. The navigation system increases the scale factor (zoomed-out to display a wider map area) when there is a sufficient amount of map data stored in the video RAM (VRAM) and a sufficient computer power is available to display the map with smooth scrolling operation. Here, the video RAM is a memory which retrieves and temporarily stores the map data from a main storage (ex. data storage medium 31 in FIG. 9) where the map data covers an area displayed on the navigation system.

Figure 5A:
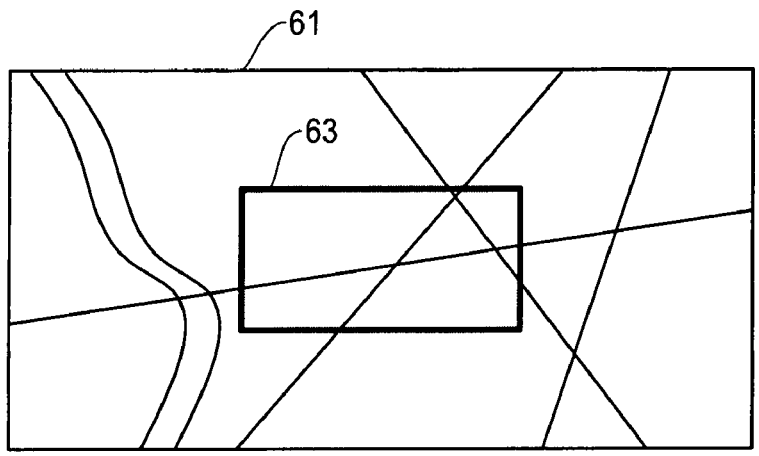
FIGS. 5A-5C are schematic diagrams showing the relationships among a drawing area, a viewing area, a map scroll direction, a scroll speed adjustment area, and a scale change involved in the adaptive scrolling method under the present invention.
Figure 5B:
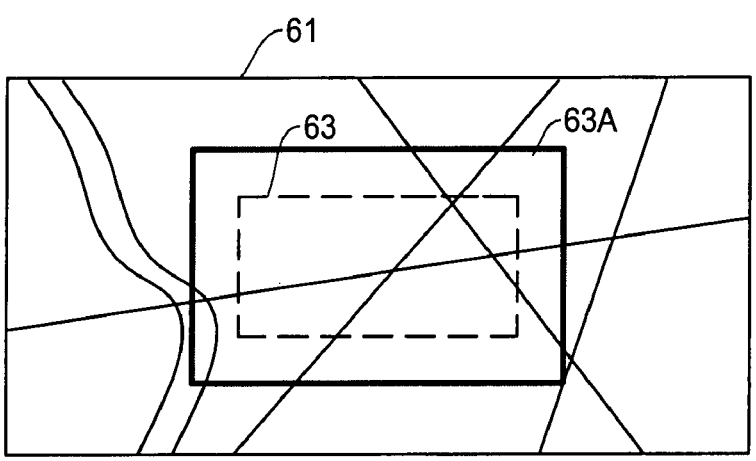
Figure 5C:
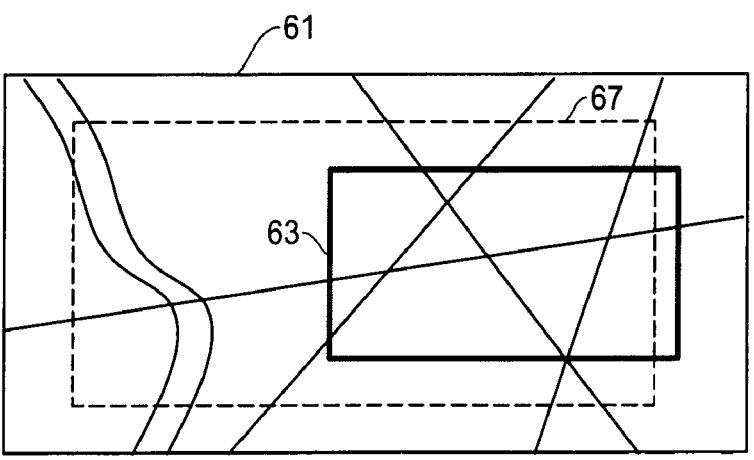

FIGS. 5A-5C are schematic diagrams showing the relationships among a drawing area, a viewing area, a map scroll direction, a scroll speed adjustment area, and a change of map scale involved in the adaptive scrolling method under the present invention. In FIGS. 5A-5C, a reference numeral 61 denotes the drawing area, a reference numeral 63 denotes the viewing area of the navigation system, and a reference number 67 denotes a scroll speed adjustment area. As shown, the drawing area 61 is much larger than the view area 63.

The drawing area 61 is an area corresponding to the map data that is currently stored in the VRAM (video random access memory) of the navigation system, i.e., the capacity of the VRAM. The viewing area 63 is an area that is actually displayed on the monitor screen of the navigation system with use of the map data in the VRAM so that the user is able to see. Thus, the drawing area 61 represents the area of the map that can be readily drawn on the monitor screen 81 (FIGS. 6A and 6B) of the navigation system without retrieving new data.

When the navigation system has to display a map area other than those inside of the drawing area 61, i.e., other than the map data already stored in the VRAM, the navigation system must retrieve new map data from such a data storage medium as CD-ROM, DVD, hard drive, etc. (data storage medium 31 in FIG. 9). Because it takes time to retrieve the new map data, the scroll performance of the navigation system will be deteriorated. This performance deterioration includes slow response of the map scroll operation, a blank screen with no or insufficient map elements, difficulty of adjusting the image on a desired location, etc.

FIG. 5C also includes the scroll speed adjustment area 67 noted above which is slightly smaller than the drawing area 61 but is substantially larger than the viewing area 63 and is illustrated by broke lines. The scroll speed adjustment area 67 is an area that defines a margin or threshold to determine whether adjustment of the scroll speed should be conducted. Typically, when the viewing area 63 is within the scroll speed adjustment area 67, the scroll speed will be increased, and when any part of the viewing area 63 exceeds the margin (border) of the scroll speed adjustment area 67 as shown in FIG. 5C, the scroll speed will be either decreased or unchanged.

FIG. 5B is a schematic view similar to that shown in FIG. 5A except that the view area 63A is enlarged, i.e., the scale factor (map scale) is increased. Namely, the viewing area 63A in FIG. 5B is larger than the original viewing area 63 of FIG. 5A which is illustrated by broke lines in FIG. 5B. Because the viewing area 63A is widened (the scale factor is enlarged), the user is able see a larger area of map image on the display to select a location. The scale factor of the viewing area 63 or 63A will be affected by many factors as noted above and as will be further described later.

In FIG. 5C, as noted above, the scroll speed adjustment area 67 defines an imaginary margin (boundary, threshold) that is set by the navigation system. The scroll speed adjustment area 67 functions as a check point boundary to determine whether the navigation system should execute an adjustment of the scroll speed. The scroll speed adjustment area 67 may be of a predetermined size, typically slightly smaller than the drawing area 61, or may be defined dynamically by checking the currently available resources of the navigation system such as a computing power.

In the example of FIG. 5C, the new viewing area 63 is moved to the right and exceeds the margin (boundary) of the scroll speed adjustment area 67. As the navigation system detects that part or whole of the view area 63 is no longer within the scroll speed adjustment area 67, it checks whether the navigation system can be ready to draw the map on the screen without involving a jerky or blank screen. This determination is made by taking several factors such as the speed at which the view area 63 is moving, the moving direction, the amount of data required for performing the appropriate scroll operation, the amount of memory available for storing the additional relevant map data, and the speed of the navigation system's hardware which is typically a computing power, etc. into consideration.

Figure 6A:
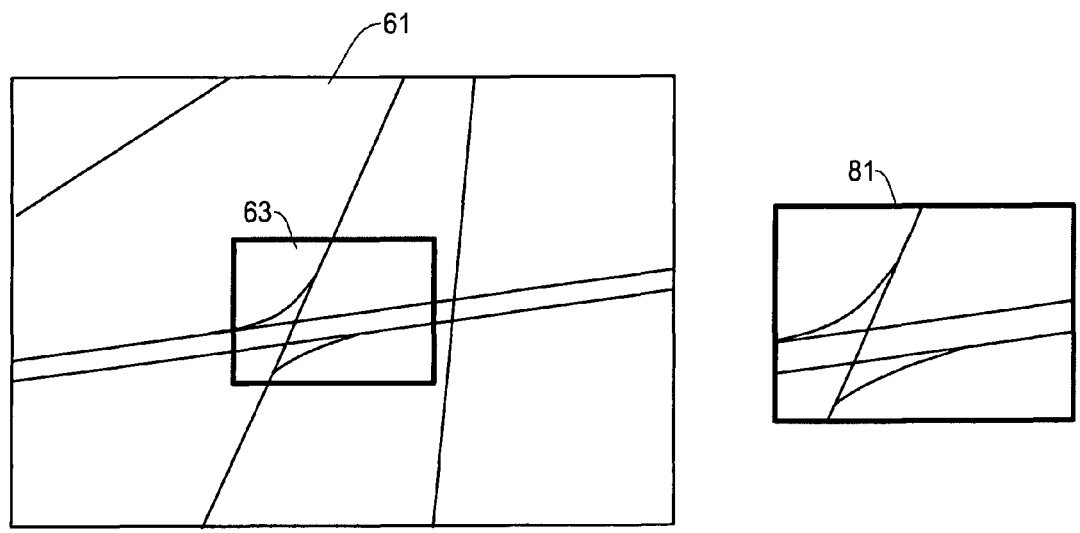
FIGS. 6A and 6B are schematic diagrams showing the relationship between the map data stored in a video RAM, the map image in a viewing area of the navigation system, and a monitor screen displaying the image in the viewing area where the size of the viewing area in FIG. 6B is larger than that of FIG. 6A.
Figure 6B:
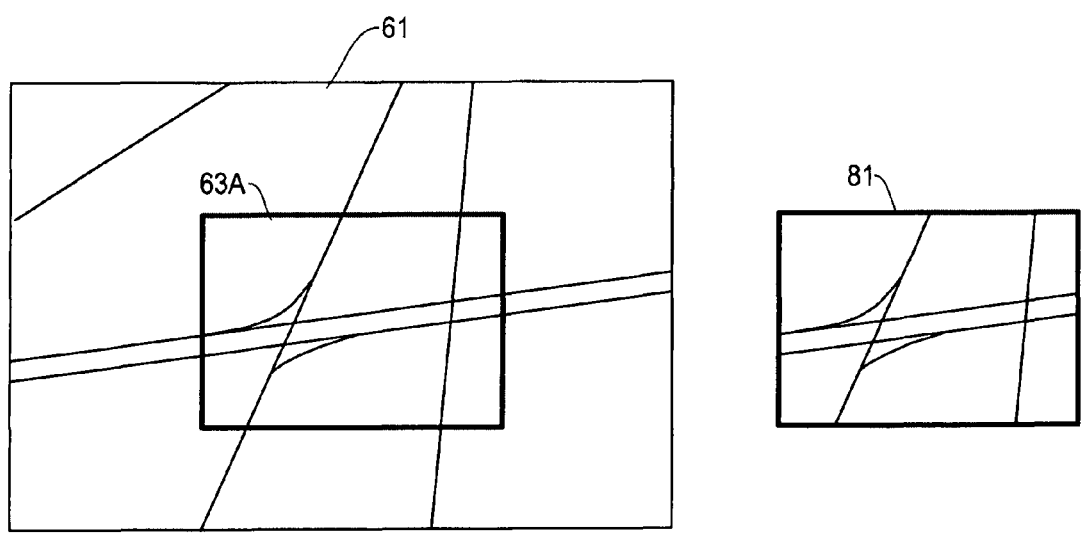

FIGS. 6A and 6B are schematic diagrams showing the relationship between the drawing area 61 (map data stored in the VRAM), the viewing area 63 of the navigation system, and the monitor screen 81 displaying the image in the viewing area 63. The size of the viewing area 63A in FIG. 6B is larger than the viewing area 63 of FIG. 6A. This means that the scale factor (map scale) of FIG. 6B is increased (zoomed-out) relative to FIG. 6A, or stated conversely, the scale factor of FIG. 6A is smaller (zoomed-in) than that of FIG. 6B.

FIGS. 6A and 6B show the drawing area 61 encompassing a map image that corresponds to the map data currently stored in the VRAM and the viewing area 63 encompassing a map image that corresponds to that shown on the monitor screen 81. The schematic views in FIGS. 6A and 6B are similar to those shown in FIGS. 5A, 5B and 5C, except that the schematic views of FIGS. 6A and 6B primarily purport to show the relationship among the drawing area 61 (data stored in the VRAM), the change of size of the viewing area 63, and the image displayed on the monitor screen 81 in response to change of the scale factor. The monitor screen 81 in FIG. 6A shows an enlarged (zoomed-in) view of the map image compared to that of FIG. 6B.

As noted above, the viewing area 63 is the area of image that is actually displayed on the monitor screen 81 of the navigation system so that the user can actually see. Also as noted above, the drawing area 61 indicates the capacity of the VRAM or map data stored in the VRAM that can be immediately retrieved as needed. Since the data for the area requires the data to be retrieved from the VRAM as opposed to such devices as hard drive or DVD disk, the time required for retrieval is generally much shorter. The procedure for changing the scale factor requires a quick re-rendering of the canvass (range of image or data on the monitor screen) using the data that already exists in the VRAM, i.e., the drawing area 61.

FIG. 6B is a schematic diagram where the scale factor is increased (zoomed-out) from the condition of FIG. 6A. As shown in FIG. 6B, the viewing area (canvass) 63A for the map to be displayed on the navigation system screen 81 is enlarged such that a larger area of the map is displayed compared to the viewing area 63 of FIG. 6A. In the present invention, the navigation system allows to flexibly change the scale factor by considering the currently available resources of the navigation system.

For example, if the current viewing area 63 (monitor screen 81) is substantially smaller than the drawing area 61, the scale factor may be increased. Further, if the current viewing area 63 is substantially smaller than the drawing area 61 and the computing power of the navigation system is relatively high, the scroll speed may also be increased. Although only two sizes of the viewing area 63 are shown in FIGS. 6A and 6B, the size of the viewing area may be changed continuously or many small steps to make a smooth scale change.

The mathematical relationship that can be implemented to the adaptive scroll method under the present invention is explained below. Referring back to FIGS. 3A and 3B, during the acceleration phase, that is, when the time t is t<T1, a scrolling inertia i and a scale factor f are expressed as:

$$i=0, f=1$$

This means that there is no inertia, and the scale factor is constant. In other words, the scrolling operation on the monitor screen stops immediately if the user stops moving the scroll keys.

Also referring to FIG. 4A, an enlarged view of FIG. 4A shows the slope which is similar to the graph between the times T1 and T2 in FIG. 3A. In this condition, the scale factor f is determined by multiplying the maximum scaling factor F with the rate of, scale change, which is further added by 1. Namely, when the time t is t>T1 and t<T2, where T2 is a time at which the scale factor reaches to the maximum value, the scrolling inertia i and the scale factor f are expressed as:

$$i=I, f=F*(t-T1)/(T2-T1)+1$$

where T1 is a threshold time to start the adaptation phase, T2 is a predetermined ramp-up time for the scaling factor f, I is a predetermined inertia value, and F is the maximum additional scale factor.

Referring back to FIGS. 3A and 3B, when the scale factor has reached the maximum value F, that is, when t=T2, the scale factor remains to be the maximum value unless the user slows down the scrolling or the navigation system determines that an adequate amount of map data for the smooth scrolling operation is not ready. This condition is expressed as:

$$i=I, f=F+1.$$

The situation in which the user releases the control after the time T3 and before the time T4 (deceleration phase) is shown in FIG. 4B which is similar to the graph between the times T3 and T4 in FIG. 3A. In this condition, the scrolling inertia i and the scale factor f can be calculated as:

$$i=I, f=f1*(T4)/(T4-T3)+1$$

where T3 is a threshold time to start the deceleration phase, T4 is a predetermined ramp-down time for the scale factor f, I is a predetermined inertia value, and F is the maximum additional scale factor.

After the scrolling operation is stopped (when t>T4), the condition as described in the following equation, which is identical to that of the initial condition as described above, is obtained:

$$i=0, f=1.$$

After T3, the scrolling speed s can be calculated as:

$$S=s*i$$

where $0<=I<1.0$, $t>T3$.

In the foregoing example, the change of scale factor is linear. It should be noted, however, that the rate of change for the scale factor can be other than linear, for example, logarithmic, exponential, etc.

Figure 7:
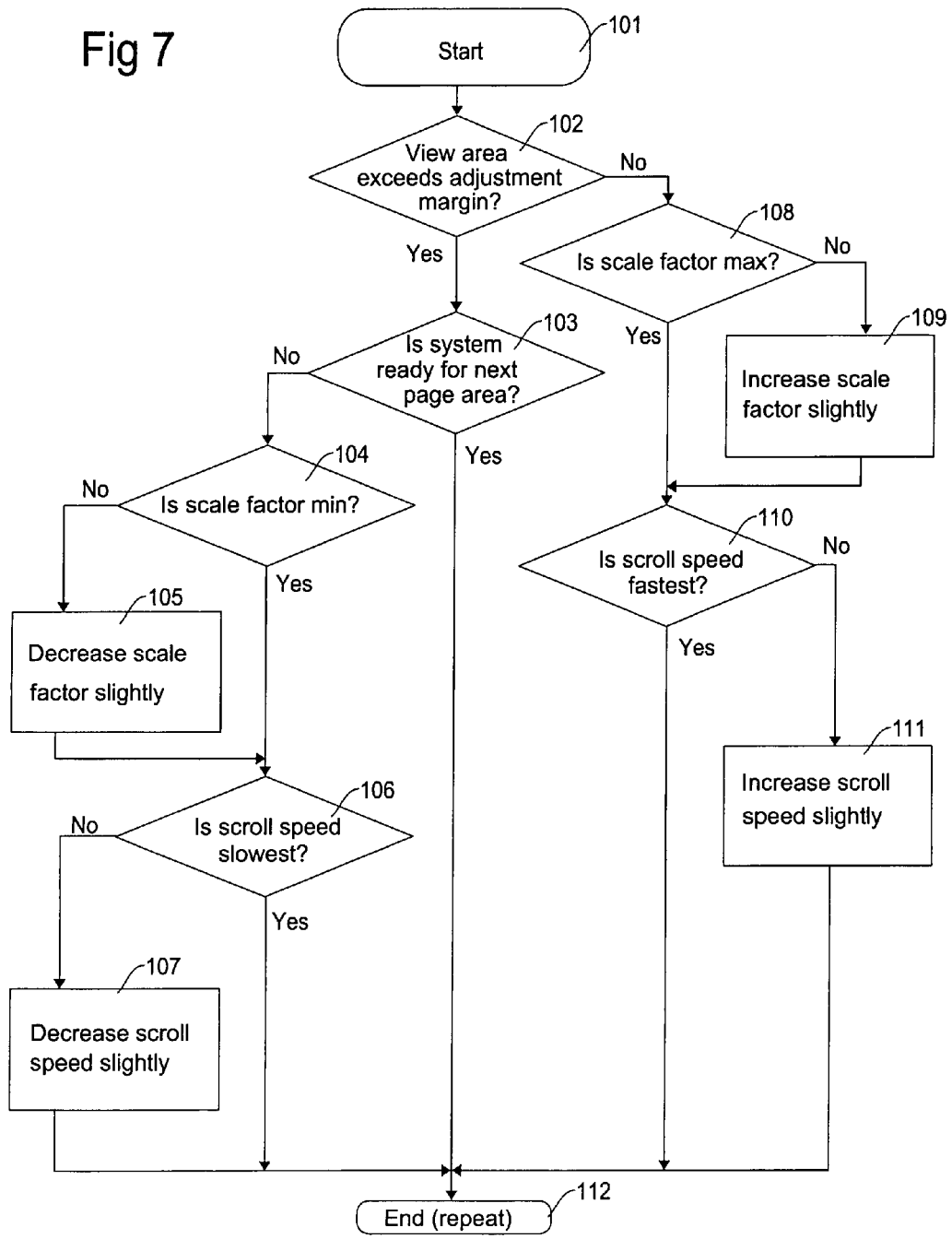
FIG. 7 is a flow chart showing an example of basic operational steps of the adaptive scrolling procedure under the present invention.

FIG. 7 is a flow chart showing the steps of the adaptive scrolling procedure under the present invention. As the user starts the scrolling procedure at the step 101, the navigation system checks whether any part of the viewing area 63 crosses the boundary of the scroll speed adjustment area 67 in the step 102. As noted above with reference to FIGS. 5A-5C, the scroll speed adjustment area 67 defines the margin or threshold for changing the scroll speed. Typically, when the viewing area 63 is within the scroll speed adjustment area 67, the scroll speed will be increased, and when any part of the viewing area 63 exceeds the margin of the scroll speed adjustment area 67, the scroll speed will be either decreased or unchanged.

Thus, if the answer is affirmative in the step 102, i.e., any part of the viewing area 63 exceeds the margin of the scroll speed adjustment area 67, it is not appropriate to increase the scroll speed. Thus, the navigation system proceeds to the step 103 to determine whether it is ready to generate the image of the next area. If the answer is yes, the navigation system does not have to perform any specific operation and goes to the step 112 to display the image or data of the next area and repeats the above procedure.

In the step 103, if the image for the next area is not ready, the navigation system will determine if the scale factor is minimum in the step 104. If the scale factor is not minimum, the navigation system will slightly decrease the scale factor in the step 105. By decreasing the scale factor and thereby narrowing the covering area of the map image to be displayed, the navigation system is able to save (shorten) a time required to display the required map image or is able to display the required map image with a lower computation power.

In the step 106, the navigation system determines whether the scroll speed is the slowest. If not, the navigation system slightly decreases the scroll speed in the step 107. By decreasing the scroll speed, the navigation system is able to same (shorten) a time required to display the required map image or is able to display the required map image with a lower computation power. Finally, the adaptive scrolling procedure proceeds to the step 112 and if required, repeats the above procedure.

In the step 102, when any part of the viewing area 63 does not exceed the margin of the scroll speed adjustment area 67, i.e., the viewing area 63 is within the scroll speed adjustment area 67, the navigation system determines whether the scale factor is maximum in the step 108. If the scale factor is not the maximum, the navigation system slightly increases the scale factor in the step 109, which has the function of widening the visible area on the map image that can be displayed on the monitor screen, i.e, the map image is zoomed-out.

Next, the navigation system determines whether the scroll speed is the highest in the step 110. If the scroll speed is not the highest, the navigation system slightly increases the scroll speed in the step 111. By increasing the scroll speed, the navigation system is able to quickly change the map image on the monitor screen in response to the user's operation. Finally, the procedure proceeds to the step 112, and the above procedure will be repeated if necessary.

Thus, as long as the viewing area 63 is within the scroll speed adjustment area margin 67, the navigation system attempts to increase the scroll speed and enlarge the visible area so that wider area can be viewed in a short period of time. When the viewing area 63 crosses the boundary or margin of the scroll speed adjustment area 67 and the navigation system is not ready to display the image for the next area, the navigation system attempts to slow down the scroll operation and decrease the visible area of the map image.

Figure 8:
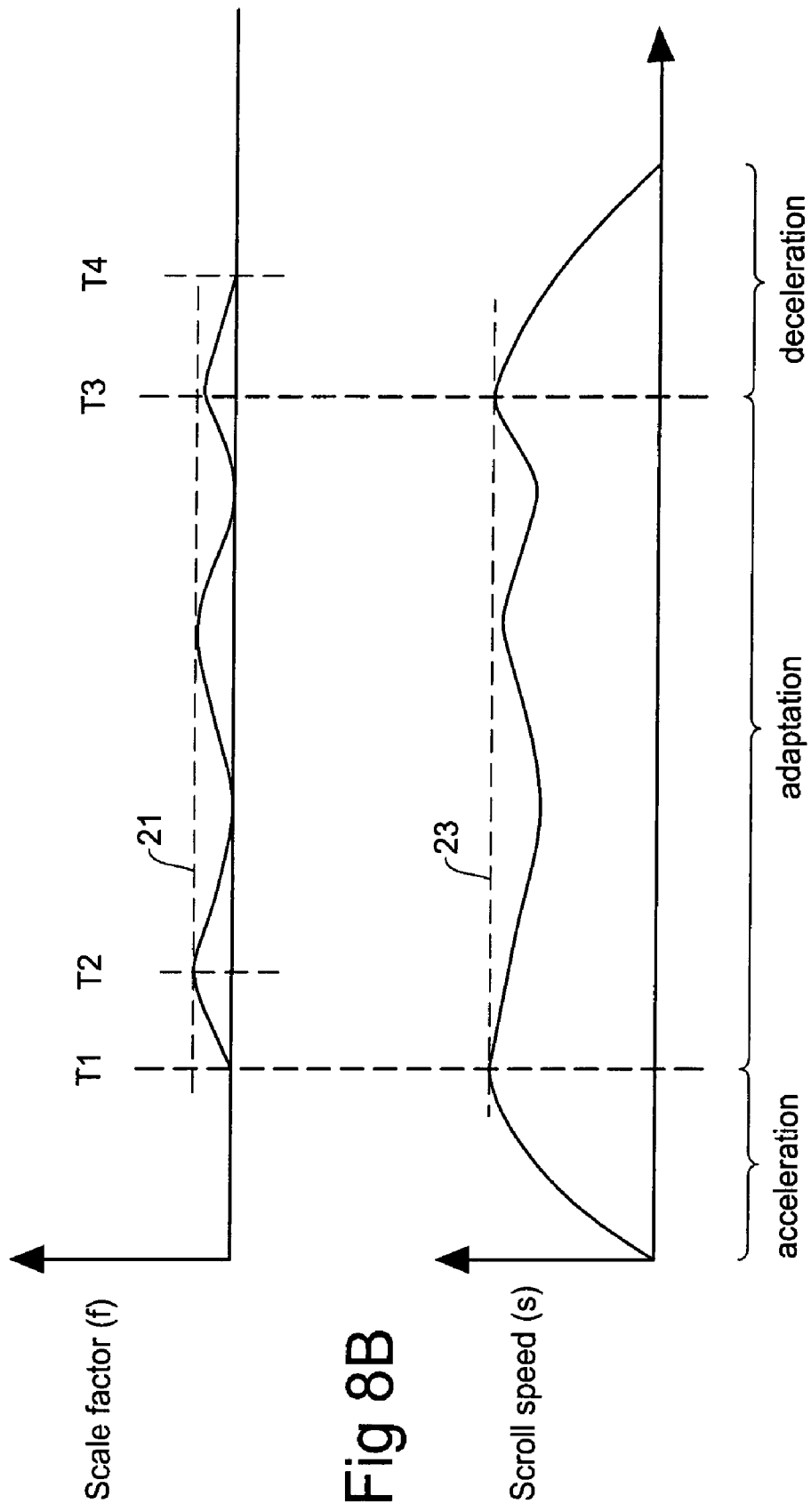
FIGS. 8A and 8B are diagrams showing map images similar to that shown in FIGS. 3A and 3B except that the scroll speed is increased or decreased logarithmically rather than linearly.

The scale factor and scroll speed shown in FIGS. 8A and 8B are similar to that shown in FIGS. 3A and 3B, except that the increase and decrease of the scale factor scroll speed are controlled logarithmically rather than linearly. The rate of increase and decrease of the scroll speed and the scale factor may be adjusted to provide a smooth and natural scrolling of the map image. Similarly, it is also feasible to increase and decrease the scale factor and scroll speed with an exponential curve. In either implementation, the navigation system is able to provide a smooth scrolling operation of the map image by dynamically adjusting the scroll speed and the scale factor in the manner described above.

Figure 9:
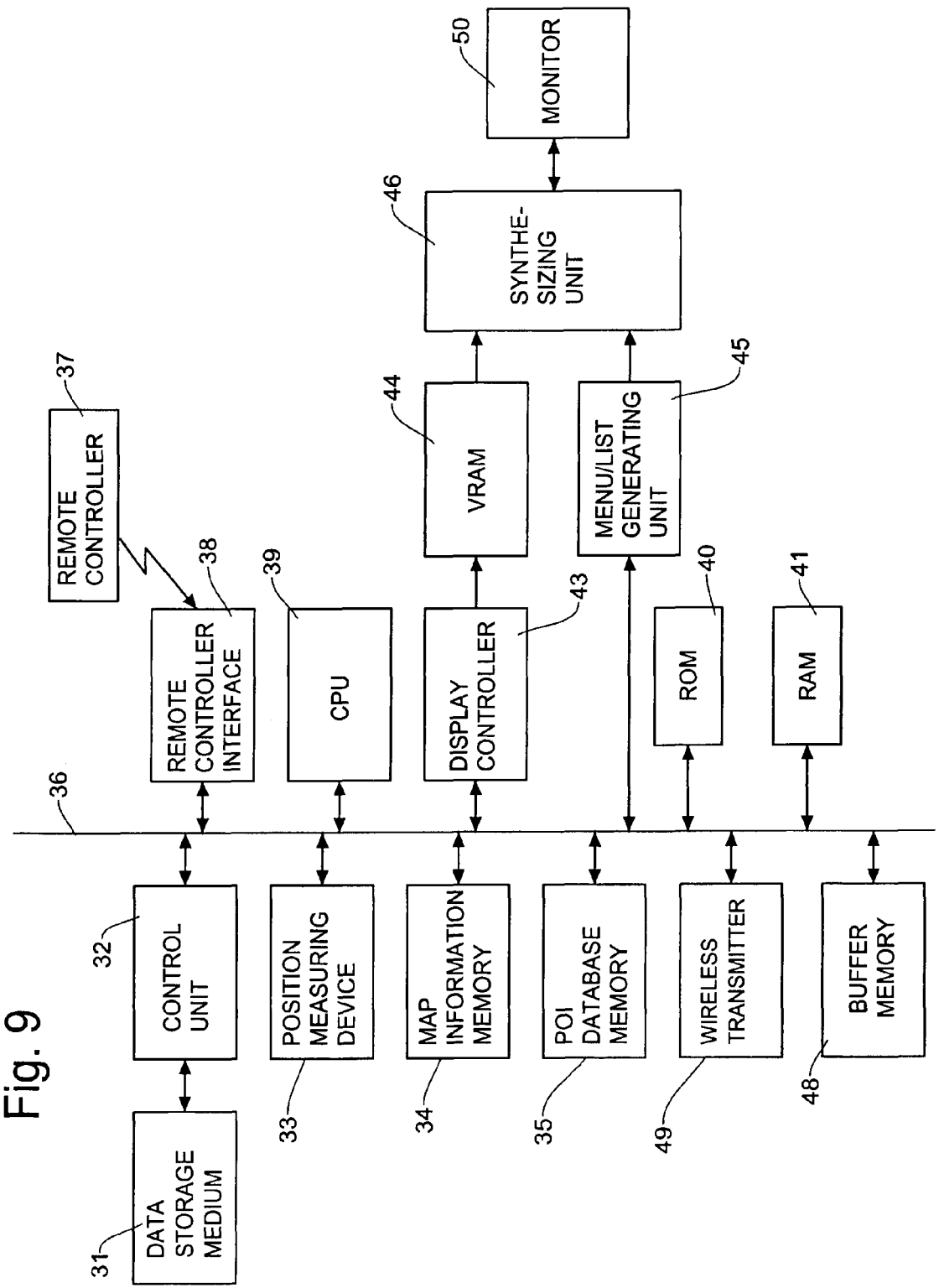
FIG. 9 is a block diagram showing an example of configuration of a vehicle navigation system implementing the adaptive scroll under the present invention.

FIG. 9 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant)

device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from a plurality of artificial satellites, and etc.

The block diagram of FIG. 9 further includes a map information memory 34 for storing the map information which is read from the data storage medium 31, a database memory 35 for storing database information such as point of interest (POI) information which is read out from the data storage medium 31, a remote controller 37 for conducting the scroll operation of the present invention, executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 9, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a wireless transmitter 49 for wireless communication to retrieve data from a remote server, a buffer memory 48 for temporally storing data for ease of data processing, and a monitor (display) 50. The drawing area 61 described above corresponds to the map data stored in the VRAM 44 or the memory capacity of the VRAM 44.

Since the time necessary for retrieval of the map data from data storage medium 31 is long and thus can hamper the performance of scrolling, the navigation system implementing the adaptive scroll method under the present invention changes the scroll speed and scale factor while monitoring the relationship between the viewing area and the map data in the VRAM 44, i.e, the drawing area 67. A program to execute the procedure described with reference to FIG. 7 will be stored in the ROM 40. Thus, the method and apparatus of the present invention provides a smooth and intuitive scrolling operation of map image or other data by considering the currently available resources.

According to the present invention, when the user operates scroll keys, the navigation system scrolls a map image on the monitor screen with an appropriate speed and size of the map image to quickly and accurately scrolls the map image to a specified direction and location. The navigation system dynamically adjusts the scroll speed and the scale factor of the map image depending on the available system resources such as map data and processing speed in the navigation system. Therefore, the navigation system is able to keep displaying the essential information on the monitor screen when scrolling the map image.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
receiving a scroll signal from an input device operated by a user for scrolling an image on a monitor screen of a navigation system;
checking a current condition of the navigation system related to a scroll operation; and
conducting the scroll operation in response to the scroll signal while adjusting a scroll speed and scale factor of the image on the monitor screen based on the current condition;
wherein the current condition includes an amount of map data stored in a video memory which stores the map data pertaining to an area displayed on the monitor screen of the navigation system, and said step of conducting the scroll operation includes a step of defining a drawing area of the image which corresponds to the map data currently stored in the video memory, a step of defining a viewing area which corresponds to the image currently displayed on the monitor screen, and a step of increasing the scale factor when the viewing area is substantially smaller than the drawing area, wherein the drawing area is larger than the viewing area.

2. A display method for a navigation system as defined in claim 1, wherein said current condition includes a computing power of the navigation system currently available for the scroll operation.

3. A display method for a navigation system as defined in claim 1, wherein said step of conducting the scroll operation includes a step of conducting an acceleration phase of the scroll operation in which the scroll speed is accelerated, a step of conducting an adaptation phase of the scroll operation in which the scroll speed is adjusted, and a step of conducting a deceleration phase of the scroll operation in which the scroll speed is decelerated so that scroll operation is stopped.

4. A display method for a navigation system as defined in claim 3, wherein said scale factor of the image is unchanged during the acceleration phase and the deceleration phase while the scale factor is adjusted during the adaptation phase.

5. A display method for a navigation system as defined in claim 1, wherein said step of conducting the scroll operation includes a step of increasing the scale factor and scroll speed when the viewing area is substantially smaller than the drawing area and a currently available computing power of the navigation system is high.

6. A display method for a navigation system as defined in claim 1, wherein said step of conducting the scroll operation includes a step of defining a scroll speed adjustment area which is smaller than the drawing area and is larger than the viewing area, and a step of decreasing the scroll speed or maintaining the same scroll speed when part of the viewing area crosses a boundary of the scroll speed adjustment area.

7. A display method for a navigation system as defined in claim 1, wherein said step of conducting the scroll operation includes a step of defining a scroll speed adjustment area which is smaller than the drawing area and is larger than the viewing area, and a step of increasing the scroll speed when the viewing area is within the scroll speed adjustment area.

8. A display method for a navigation system as defined in claim 1, wherein said step of conducting the scroll operation includes a step of changing the scroll speed and scale factor either linearly or non-linearly.

9. A display apparatus for a navigation system, comprising:
means for receiving a scroll signal from an input device operated by a user for scrolling an image on a monitor screen of a navigation system;
means for checking a current condition of the navigation system related to a scroll operation; and
means for conducting the scroll operation in response to the scroll signal while adjusting a scroll speed and scale factor of the image on the monitor screen based on the current condition;
wherein the current condition includes an amount of map data stored in a video memory which stores the map data pertaining to an area displayed on the monitor screen of the navigation system, and said means of conducting the scroll operation includes a means of defining a drawing area of the image which corresponds to the map data currently stored in the video memory, a means of defining a viewing area which corresponds to the image currently displayed on the monitor screen, and a means of increasing the scale factor when the viewing area is substantially smaller than the drawing area, wherein the drawing area is larger than the viewing area.

10. A display apparatus for a navigation system as defined in claim 9, wherein said current condition includes a computing power of the navigation system currently available for the scroll operation.

11. A display apparatus for a navigation system as defined in claim 9, wherein said means for conducting the scroll operation includes means for conducting an acceleration phase of the scroll operation in which the scroll speed is accelerated, means for conducting an adaptation phase of the scroll operation in which the scroll speed is adjusted, and means for conducting a deceleration phase of the scroll operation in which the scroll speed is decelerated so that scroll operation is stopped.

12. A display apparatus for a navigation system as defined in claim 11, wherein said scale factor of the image is unchanged during the acceleration phase and the deceleration phase while the scale factor is adjusted during the adaptation phase.

13. A display apparatus for a navigation system as defined in claim 9, wherein means for conducting the scroll operation includes means for increasing the scale factor and scroll speed when the viewing area is substantially smaller than the drawing area and a currently available computing power of the navigation system is high.

14. A display apparatus for a navigation system as defined in claim 9, wherein said means for conducting the scroll operation includes means for defining a scroll speed adjustment area which is smaller than the drawing area and is larger than the viewing area, and means for decreasing the scroll speed or maintaining the same scroll speed when part of the viewing area crosses a boundary of the scroll speed adjustment area.

15. A display apparatus for a navigation system as defined in claim 9, wherein said means for conducting the scroll operation includes means for defining a scroll speed adjustment area which is smaller than the drawing area and is larger than the viewing area, and means for increasing the scroll speed when the viewing area is within the scroll speed adjustment area.

16. A display apparatus for a navigation system as defined in claim 9, wherein said means for conducting the scroll operation includes means for changing the scroll speed and scale factor either linearly or non-linearly.

* * * * *